United States Patent [19]
Gilbert

[11] 4,036,068
[45] July 19, 1977

[54] ENCAPSULATED TRANSMISSION UNIT

[76] Inventor: Robert B. Gilbert, 443 Hazelhurst St., New Lebanon, Ohio 45345

[21] Appl. No.: 650,797

[22] Filed: Jan. 20, 1976

Related U.S. Application Data

[62] Division of Ser. No. 346,625, March 30, 1973, Pat. No. 3,948,112.

[51] Int. Cl.² ............................................. F16H 55/52
[52] U.S. Cl. ............................................. 74/230.17 E
[58] Field of Search ............... 74/230.17 E, 230.17 A, 74/230.17 M, 217 R, 217 B

[56] References Cited

U.S. PATENT DOCUMENTS

| | | | |
|---|---|---|---|
| 3,234,806 | 2/1966 | Maurer et al. | 74/230.17 M |
| 3,757,593 | 9/1973 | Svenson | 74/230.17 A |

Primary Examiner—Benjamin W. Wyche
Assistant Examiner—Frank H. McKenzie, Jr.
Attorney, Agent, or Firm—Jerome P. Bloom

[57] ABSTRACT

This invention features the concept of packaging a transmission so that it can be selectively embodied in any drive system as a unitary structure and serve per se, if desired, as the hub of a rotary drive element. A distinctive feature of this package is that the housing of the transmission unit serves as an output element.

A preferred embodiment of the above described concept incorporates details of an output speed-controlled transmission comprising an input shaft, an output shaft and adjustable drive means by which said input shaft drives said output shaft and is characterized by means responsive to the rotational speed of the output shaft to adjust the drive means so as to maintain a predetermined rotational speed condition of the input shaft.

18 Claims, 8 Drawing Figures

ENCAPSULATED TRANSMISSION UNIT

This application is a division of applicant's copending application for United States Letters Patent Ser. No. 346,625 entitled "OUTPUT SPEED-CONTROLLED TRANSMISSION", which was filed Mar. 30, 1973 now U.S. Pat. No. 3,948,112.

BACKGROUND OF THE INVENTION

This invention features improvements in transmission means and more particularly the encapsulation of a transmission to present it in a unitized form the construction of which provides that its housing forms a medium for transmitting its output. While the invention will be illustrated with reference to the embodiment therein of the features of a unique output speed-controlled transmission system forming the subject matter of the claims of the aforementioned co-pending application for United States Letters Patent, it will be seen from the disclosure that the invention features may equally be advantageously employed in conjunction with conventional transmission systems. In any case, the basic invention on which the claims of the present disclosure are based is such to provide a unitary structure which may be easily and effectively applied in connection with a drive system and even embodied as the hub of a driven rotary element having significant economic and environmental benefits, particularly when embodied in conjunction with the aforementioned unique output speed-controlled transmission. Accordingly, such output speed-controlled transmission is fully detailed to provide illustrative examples of embodiment of the present invention. With this in mind, the following information must be considered.

In efforts to produce more efficient transmissions, prior art workers have devised a number of means to control drive train ratio. These controllers, however, are responsive to the input shaft speed. Furthermore all prior control systems related to control of drive train ratios known to applicant require an increase in the speed of the input shaft of the transmission to produce an increase in the speed of its output shaft.

For example, in standard hydraulic automatic transmissions having automotive application, the gear train ratio is controlled primarily by the speed of the automobile engine. That is, on increasing engine speed hydraulic pressure changes effect change in the transmission ratio and the transmission output speed is correspondingly increased. In conventional pulley belt transmissions, centrifugal weights or the like in the transmission input shaft effect a decrease in pulley ratio with an increase in the input shaft speed.

By means of the present invention a new and improved speed-controlled transmission system has been developed wherein the control of the respective speeds of the input and output shafts is determined by means in association with the transmission output shaft and responsive to its speed. This transmission may be so designed as to effect an increase in the speed of rotation of the input shaft in correspondence with and as a result of the speed of rotation of the output shaft. Moreover, it offers two additional distinct capabilities, after initial startup, not inherent in conventional systems. It may be so designed as to have the input shaft turned at a speed which is decreased in respect to the output shaft speed and vice versa. The transmission may also be arranged to maintain a constant speed at the input shaft with an increasing output shaft speed.

A significant consequence of the transmission system of the invention is its inherent capabilities to effectively diminish air pollution in use of an internal combustion engine.

Much attention has been recently given to the problems of emissions control. A primary difficult in achieving proper emissions control, in automotive vehicles, for example, lies in the fact that for each automotive engine speed there are many variables to be considered, such as air-fuel ratio, spark advance, cam timing and the like. Since optimum conditions of these variables will change for different engine speeds, it is substantially impossible to design an engine which optimizes the variables to produce minimum emissions for the full range of speeds of an operating engine. By contrast, in using the transmission system of the present invention, the engine speed could be caused to remain at a predetermined constant regardless of the vehicle speed (after an initial change of engine speed during start-up) and the variables could be adjusted to give minimum emissions at that predetermined speed. Furthermore, this predetermined engine speed could be so chosen as to cause the engine to operate at its maximum power output speed, regardless of the automobile speed.

Consider also, in a number of vehicles, such as minibikes, snowmobiles and the like, which currently employ pulley belt systems, the engine speed increases with vehicle speed with the result that the vehicle speed is limited by the engine speed and not by the power required to drive the vehicle at high speed. Through the use of the transmission system of the present invention, the maximum speed potential of such vehicles could be realized since at high vehicle speeds the engine could be made to operate at a safe speed, and one at which it produces maximum horsepower.

Pedal powered devices such as bicycles and the like are prime examples of vehicles, the speed of which is limited by the input speed. To overcome this problem prior art workers have devised systems employing up to 15 different gear ratios. These systems are complex and require the slipping of a chain form one gear to another to effect a ratio change. Substitution of the invention transmission would enable a cyclist to pedal at a constant speed (after an initial startup phase) regardless of the vehicle speed and no manual gear changes would be required. This will be described.

The transmission of the present invention may also be advantageously used in electric motor-powered devices. When an electric motor is used to drive a piece of equipment characterized by high inertia, the electric motor tends to accelerate to its operational speed before the equipment during startup. This can result in excessive belt slippage when using a conventional transmission. Through the use of the present transmission, the motor could operate at its maximum power during startup without belt slippage.

A most significant incident of the present invention is the evolution of a unitized speed-controlled transmission the nature and character of which is such to enable a transmission to be easily and effectively installed by one having little experience or knowledge of the transmission art. It is a characteristic of invention embodiments that the housing for the transmission forms a functional part thereof and in fact an element through which the output of the transmission is routed. As mentioned previously, the incorporation of the features of the ouput speed-controlled transmission described herein provides embodiments of the invention having important consequences in the development of the transmission art.

SUMMARY OF THE INVENTION

In the illustrative embodiments herein described the invention is illustrated to comprise a housing adapted to be rotatively mounted on an axle provided in the machine in which the embodiment is incorporated to form part of its drive system. Arranged within the housing and for connection to the axle so as to prevent their rotation are frame elements mounting for rotation therein an input shaft and an output shaft shown to be supported in a parallel spaced relation. Each shaft mounts a two-piece pulley assembly one of which is fixed for rotation with the shaft and against axial movement thereon and the other of which is fixedly mounted to the shaft but in a manner to accommodate its axial movement along the shaft toward and away from the associated pulley half, within defined limits. The paired pulley halves on each of the shafts are conical in configuration at their adjacent faces so as to mutually define a V-shaped groove about the periphery. This enables the pulley assemblies in connection with respective shafts to be connected by a V-belt. In the embodiments illustrated, there is associated with the transmission output shaft speed sensing means, in various form, so designed and incorporated as to move the shiftable pulley half of one of the pulley assemblies toward and away from its associated fixed half in response to and to a degree determined by the speed of the output shaft. Of particular significance is the fact that the output shaft is drivingly related to the transmission housing which thereby forms its output member.

As will be seen, the encapsulated transmission unit of the invention may be coupled to any driving element in a machine in which it is embodied in a manner that the housing serves as a functional connecting element. In a preferred embodiment illustrated the entire transmission unit is shown as the hub of a wheel forming a driving element for vehicle, in this case the rear wheel of a bicycle type vehicle.

It will be seen that the housing of the transmission unit of the invention accommodates therein, for rotation relative thereto, a means through which any drive means may be coupled to and drivingly related to the input shaft of the transmission. The input shaft of the transmission may be connected, for example, to the drive shaft of any drive means, such as an internal combustion engine, an electric motor, or even a pedal drive means. In automotive applications the output shaft of the transmission may be connected to the rear wheels of the automobile through a forward-neutral-reverse box and a conventional differential such as known in the art. On the other hand, the output shaft may be connected directly to the input shaft of any machine or element to be driven. A manually or automatically controlled override may be provided in association with the transmission to counteract the action of the speed sensing means when required.

A primary object of the invention is to provide a unique encapsulated transmission unit having multiple applications which is easy to fabricate, more efficient and satisfactory in use and adaptable to a wide variety of applications without danger of malfunction.

Another object of the invention is to provide a unit structure embodying a total transmission the form of which facilitates its application to form part of a drive system.

A further object of the invention is to provide a unique encapsulated transmission unit the housing of which is utilized in providing its output.

An additional object of the invention is to provide a unique encapsulated transmission unit embodying an output speed-controlled transmission wherein the output is directed through the transmission housing which forms a functional part thereof.

A further object of the invention is to provide a unique governor unit which may be embodied in connection with the output shaft of a conventional transmission unit with ease and simplicity of structural application.

An additional object of the invention is to provide improvements in transmission units possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

DESCRIPTION OF PREFERRED EMBODIMENTS

Figure 1:
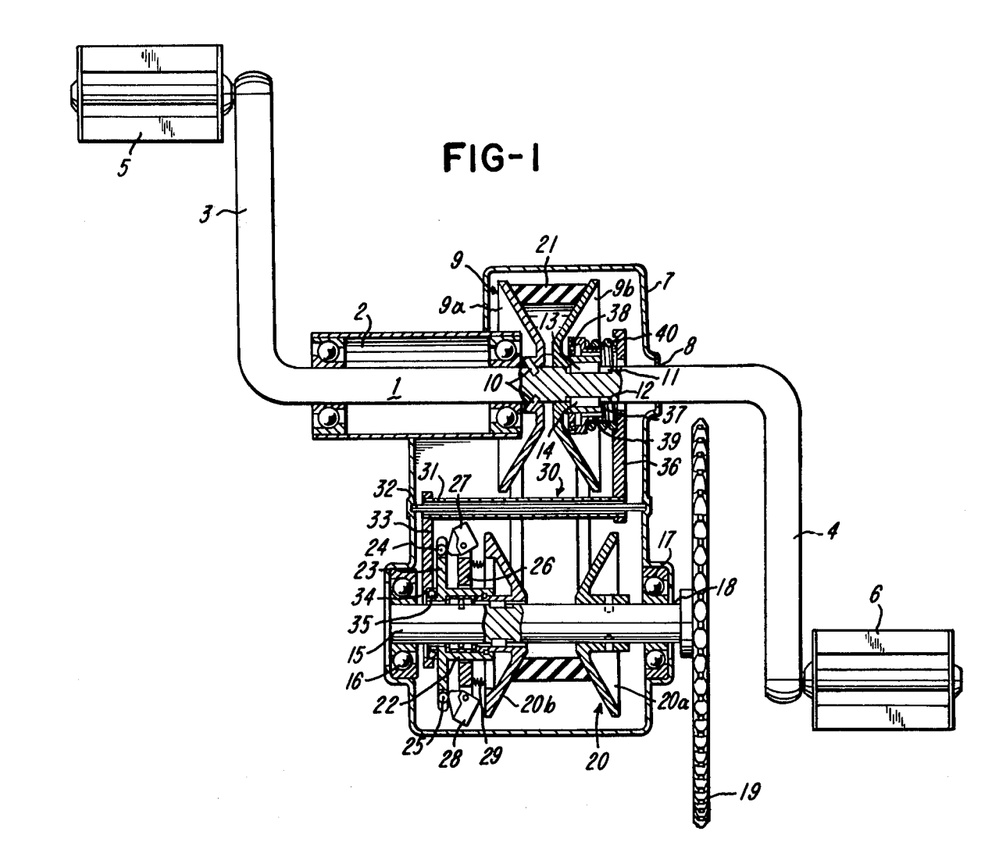
FIG. 1 is a plan view, partly in cross section, of an embodiment of the transmission features of the present invention applied to a pedal-driven vehicle.

A basic embodiment of the output speed-controlled transmission of the present invention, as applied to a pedal-driven vehicle such as a bicycle, is illustrated in FIG. 1. In FIG. 1 an input shaft 1 is shown mounted in a bearing means 2 affixed to the bicycle frame (not shown). The input shaft 1 has angularly related ends 3 and 4 provided with pedals 5 and 6, respectively. A housing 7 surrounds the transmission and the input shaft 1 extends through a perforation 8 in the housing.

The input shaft 1 supports a pulley assembly generally indicated at 9. The pulley assembly comprises a first pulley half 9a fixedly and non-rotatively mounted on the input shaft 1 in any appropriate manner, as by pins 10. A second pulley half 9b is non-rotatively mounted on the input shaft 1 but is axially shiftable therealong toward and away from pulley half 9a. The mounting of pulley half 9b may be accomplished in any appropriate manner. For example, the input shaft 1 may be provided with a pair of diametrically opposed slots 11 and 12 adapted to receive keys 13 and 14 affixed to pulley half 9b. The keys will prevent rotation of the pulley half with respect to the shaft 1, but will permit a shifting of the pulley half axially of the shaft, within the limits of the slots 11 and 12.

The transmission of FIG. 1 also includes an output shaft 15. The output shaft is rotatively mounted in suitable bearings 16 and 17 in the housing 7. One end of the output shaft 15 extends through an opening 18 in the housing and carries a chain sprocket 19. The chain sprocket 19 is conventional and may be connected to a drive sprocket (not shown) on the rear wheel of the bicycle (not shown) by a drive chain (not shown), all as is conventional in the art.

The output shaft 15 of the transmission carries a pulley assembly generally indicated at 20. The pulley assembly 20 comprises a first pulley half 20a fixedly and non-rotatively mounted to the shaft in the same manner described with respect to pulley half 9a above. The pulley assembly includes a second pulley half 20b non-rotatively affixed to the output shaft but axially shiftable thereon. The pulley half 20b may be mounted on shaft 15 in the same manner described with respect to pulley half 9b. The pulley assemblies 9 and 20 are connected by a V-belt 21.

The embodiment of FIG. 1 is provided with a centrifugal type speed sensing means for the output shaft 15. The shiftable pulley half 20b has a cylindrical extension 22 terminating in an annular flange 23 bearing cam rollers 24 and 25. A mounting means 26 is provided having centrifugal weights 27 and 28 pivoted thereon. The centrifugal weights 27 and 28 have cam surfaces cooperating with the cam rollers 24 and 25, respectively. The mounting means 26 is rotatable with pulley half 20b and output shaft 15, but is not axially shiftable with respect to output shaft 15. This may be accomplished by affixing the mounting means 26 to the shaft 15 through longitudinal slots in the cylindrical extension 22. Control spring means 29 is located between mounting means 26 and the pulley half 20b.

It will be evident that as the rotational speed of output shaft 15 and mounting means 26 increases, the centrifugal weights 27 and 28 will pivot outwardly. The cam surfaces on these weights will cooperate with cam rollers 24 and 25 to shift the assembly comprising the flange 23, cylindrical extension 22 and pulley half 20b toward the left as viewed in FIG. 1 (i.e., away from pulley half 20a). The amount of shift imparted by the weights 27 and 28 will depend upon the configuration of the cam surfaces thereon. The amount by which the weights 27 and 28 pivot outwardly will, in turn, depend upon the rotational speed of shaft 15 and the action of control springs 29. Upon a reduction in rotational speed of an output shaft 15, cam weights 27 and 28 will swing inwardly toward output shaft 15 with the influence of control springs 29 thus providing for pulley half 20b to move toward pulley half 20a.

As indicated above, pulley assemblies 9 and 20 are joined by a V-belt 21. In order for the desired transmission ratio change to take place, it is required that shiftable pulley half 9b on input shaft 1 move simultaneously and oppositely when shiftable pulley half 20b on output shaft 15 is moved, so that the slack in V-belt 21 is appropriately taken up. By "oppositely" is meant that as pulley half 20b moves away from pulley half 20a, pulley half 9b will shift toward pulley half 9a, and vice versa.

To accomplish appropriate corresponding movements of pulley halves 9b and 20b, these pulley halves may be mechanically connected by a yoke means generally indicated at 30. The yoke means comprises a cylindrical element 31 mounted on a shaft 32 extending between opposite side walls of housing 7 and in parallel spaced relationship with input shaft 1 and output shaft 15. The cylindrical element 31 is axially shiftable with respect to shaft 32.

At one end the cylindrical element 31 has an arm 33. The arm 33 has a perforation 34 through which output shaft 15 extends. An appropriate thrust bearing 35 is mounted in the perforation 34 in abutment with flange 23 of pulley half 20b.

The cylindrical element 31 carries at its other end a second arm 36 having a perforation 37 through which the input shaft 1 extends. A thrust bearing 38 and sleeve 39 are operatively attached to shiftable pulley half 9b. A spring 40 surrounds the sleeve 39. One end of the spring is in abutment with the sleeve 39 and thrust bearing 38. The other end of the spring is in abutment with yoke arm 36.

The spring 40 serves two purposes. First of all, it assures that the arm 33 of the yoke structure is always in contact with the structure of pulley half 20b. Furthermore, it assures that the pulley assemblies 9 and 20 will exert sufficient force on V-belt 21 to prevent slippage thereof.

The yoke assembly 30, just described, assures proper movement of pulley halves 9b and 20b. It also maintains correct alignment of V-belt 21 when one pulley is opened and the other is closed, thereby minimizing skewing of the belt and consequent accelerated wear thereof, so often found in utilizing conventional pulley belt type transmission units of the prior art.

It will be understood by one skilled in the art that it is within the scope of the invention to eliminate the yoke assembly 30, in which event the right hand end of spring 40 (as viewed in FIG. 1) will be provided with an appropriate abutment means. In such case, the spring 40 will be relied upon to cause the pulley assemblies to maintain proper tension on V-belt 21 and to cause or permit pulley half 9b to shift toward or away from pulley half 9a upon the occurrence of an axial shift of pulley half 20b which correspondingly moves belt 21 in or out, in a radial sense referenced to shaft 15.

The operation of the output speed-controlled transmission of FIG. 1 may be described as follows. By appropriate selection of control springs 29 and by appropriate configuration of the cam surfaces on weights 27 and 28, the transmission may be designed to allow the cyclist to pedal at a constant speed (after initial startup) regardless of the bicycle speed.

After the initial startup phase, if an increase in bicycle speed is desired, increased torque on input shaft 1 by the cyclist is transmitted to the rear or driving wheel of the bicycle through the output-controlled transmission. The increased torque at the rear wheel of the bicycle will accelerate it. As the bicycle begins to change speed, a simultaneous change in speed of the transmission output shaft 15 will occur. This increase in speed of output shaft 15 will result in an outward swinging of centrifugal weights 27 and 28. The amount of outward swing of weights 27 and 28 with the increase in speed of output shaft 15 will be determined primarily by control springs 29.

Outward movement of centrifugal weights 27 and 28 will result in an axial shift of pulley half 20b away from pulley half 20a by virtue of the cooperation of the cam surfaces on weights 27 and 28 and the cam rollers 24 and 25 on flange 23. The amount of axial shift of pulley half 20b with respect to the swing of centrifugal weights 27 and 28 will be prescribed by the configuration of the cam surfaces on weights 27 and 28.

The axial shift of pulley half 20b away from pulley half 20a will cause a simultaneous and opposite shift of pulley half 9b toward pulley half 9a by virtue of the yoke assembly 30. Thus, simultaneously, the opening of pulley assembly 20 is translated through the yoke assembly 30 to a closing of pulley assembly 9. The relative opening of pulley assembly 20 and closing of pulley assembly 9 causes the belt 21 to shift outwardly on pulley assembly 9 and inwardly on pulley assembly 20. Thus a new transmission ratio is established.

When the bicycle speed is reduced to that speed determined by the startup phase, the various elements of the transmission will function in a manner opposite to that just described. Thus, the centrifugal weights 27 and 28 will swing inwardly toward the ouput shaft 15 and the pulley assembly 20 will be closed while the pulley assembly 9 will be opened. In this manner, the original transmission ratio after the startup phase will be reestablished.

Since, as indicated above, the transmission may be designed to allow the cyclist to pedal at a constant speed (after initial startup) regardless of the bicycle speed, the bicycle speed is not limited by the input shaft speed and no manual gear changes or complex gear systems are required.

Figure 2:
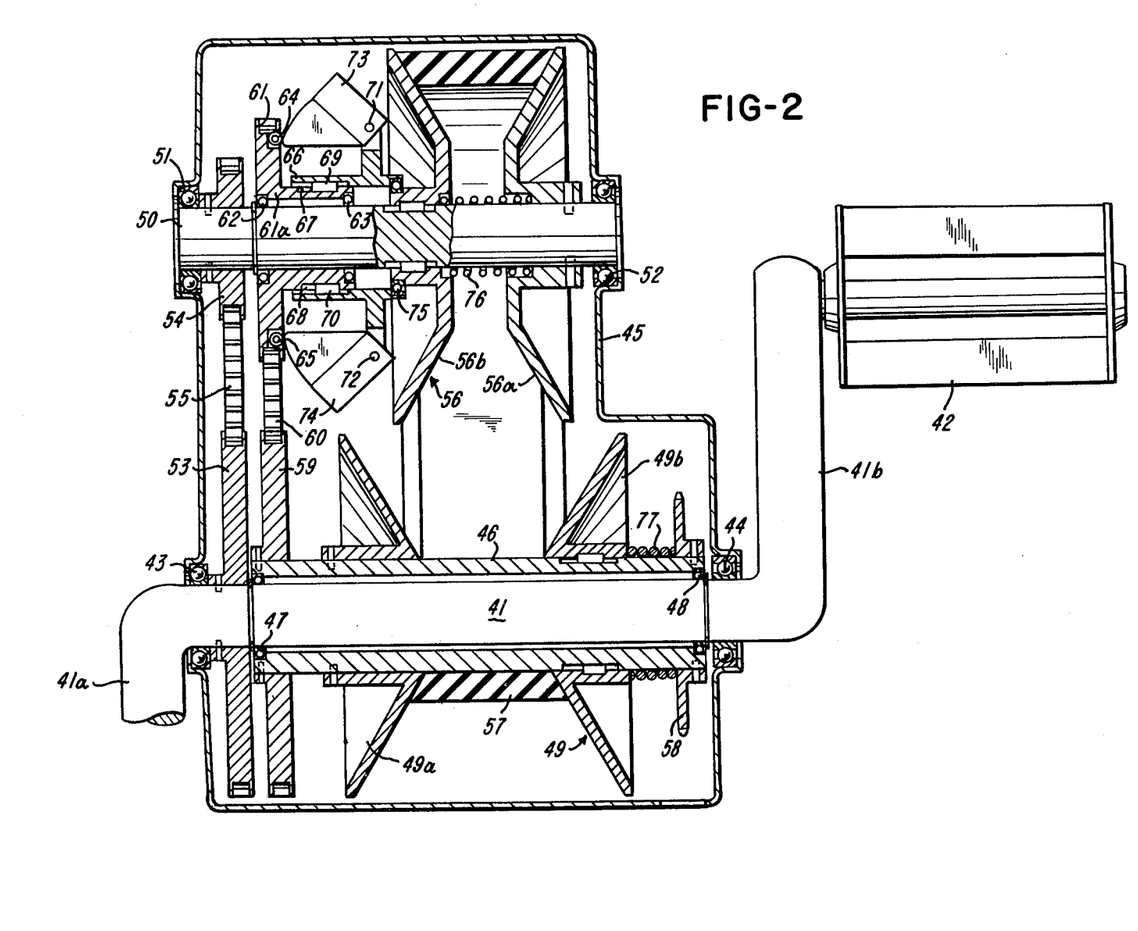
FIG. 2 is a fragmentary view of another embodiment of the transmission features for use in a pedal-driven vehicle.

FIG. 2 illustrates a further embodiment of the present invention, in reference to a pedal operated vehicle, though its application is obviously not so limited. As shown, an input shaft 41 having angularly related ends 41a and 41b provided with pedal means 42 (one of which is shown) is rotatively mounted in bearings 43 and 44 in a housing 45. A tubular output shaft 46 is concentric with and rotatively mounted on the shaft 41 by means of appropriately interposed bearings 47 and 48. The shaft 46 mounts a pulley assembly 49 comprising a first half 49a fixedly and non-rotatively mounted on the output shaft in the manner described above. The pulley assembly 49 includes a second pulley half 49b non-rotatively mounted on the output shaft but capable of axial shifting thereon toward and away from the pulley half 49a. The mounting of pulley half 49b on output shaft 46 may be accomplished as described above.

A third shaft 50, rotatable in bearings 51 and 52 in the housing 45, is mounted in parallel spaced relationship to input shaft 41 and output shaft 46.

Input shaft 41 has, non-rotatively mounted thereon, a cog wheel 53. A cog wheel 54 is non-rotatively fixed to the shaft 50 and joined to the cog wheel 53 by a cog belt 55. As a consequence of this, shaft 50 constitutes an input shaft, being an extension of input shaft 41, the rotational movement of which is imparted to shaft 50 by cog belt 55.

Shaft 50 mounts a pulley assembly 56 comprising a first pulley half 56a and a second pulley half 56b. Pulley half 56a is fixedly and non-rotatively mounted on shaft 50. Pulley half 56b is non-rotatively mounted to the shaft, but is capable of axial shifting therealong toward and away from pulley half 56a. The mounting of pulley halves 56a and 56b may be accomplished in the manner set forth above. As described, pulley assembly 56 may be considered the input pulley assembly while pulley assembly 49 may be considered to be the output pulley assembly. The pulley assemblies are joined by a V-belt 57.

The output shaft 46 mounts a sprocket 58 which may be connected by conventional chain means (not shown) to the rear wheel sprocket of the bicycle (not shown), as is known in the art.

Shaft 46 has non-rotatively affixed thereto a cog wheel 59 connected by a cog belt 60 to an annular cog wheel 61 on shaft 50. Wheel 61 incorporates a cylindrical sleeve portion 61a supported for rotation on shaft 50 by suitable bearing means 62 and 63. Cog wheel 61 carries a pair of cam rollers 64 and 65.

A cylindrical sleeve 66 surrounds the extension 61a of cog wheel 61 and is non-rotatively mounted thereon; but sleeve 66 is axially shiftable with respect to cog wheel portion 61a. This may be accomplished by providing portion 61a with at least one pair of diametrically opposed longitudinal slots 67 and 68 and providing the sleeve 66 with a pair of cooperating keys 69 and 70. The sleeve 66 has pivotally affixed thereto as at 71 and 72 a pair of centrifugal weights 73 and 74, respectively. These weights have cam surfaces coacting with cam rollers 64 and 65. An end of sleeve 66 contacts shiftable pulley half 56b through a thrust bearing 75.

From the assembly just described, it will be noted that the speed of output shaft 46 will be transmitted by cog wheel 59 and cog belt 60 to cog wheel 61. At the same time, this rotational speed will also be transmitted to sleeve 66 and the centrifugal weights 73 and 74 mounted thereon. As the rotational speed of shaft 46 increases, centrifugal weights 73 and 74 will shift outwardly and their coaction with cam rollers 64 and 65 will cause the sleeve 66 together with pulley half 56b to move toward pulley half 56a.

A spring 76 is mounted on shaft 50 with its ends abutting pulley halves 56a and 56b. It will be understood that the spring 76 serves substantially the same purpose as control springs 29 of FIG. 1 and will govern the amount by which the centrifugal weights 73 and 74 swing outwardly in response to the rotational speed of output shaft 46. The amount by which pulley half 56b is shifted toward pulley half 56a will be determined largely by the cam surfaces on the centrifugal weights 73 and 74, and by spring 76.

To accomplish the required simultaneous and opposite movement of pulley half 49b toward pulley half 49a, a spring 77 is mounted on shaft 46. The spring 77 abuts the sprocket 58 at one end and the pulley half 49b at the other.

The operation of the emobidment of FIG. 2 is substantially identical to that of FIG. 1. Thus, as the rotational speed of output shaft 46 increases, so will the rotational speed of the sensing means or centrifugal weights 73 and 74. Their outward movement will cause a shift of pulley half 56b toward pulley half 56a. This, in turn, will result in a movement of pulley half 49b away from pulley half 49a thus changing the pulley ratio. Again, proper selection of spring 76 and appropriate configuration of the cam surfaces on centrifugal weights 73 and 74 may be provided to maintain the speed of input shaft 41 constant irrespective of the speed of output shaft 46 (after the initial startup phase).

Figure 3:
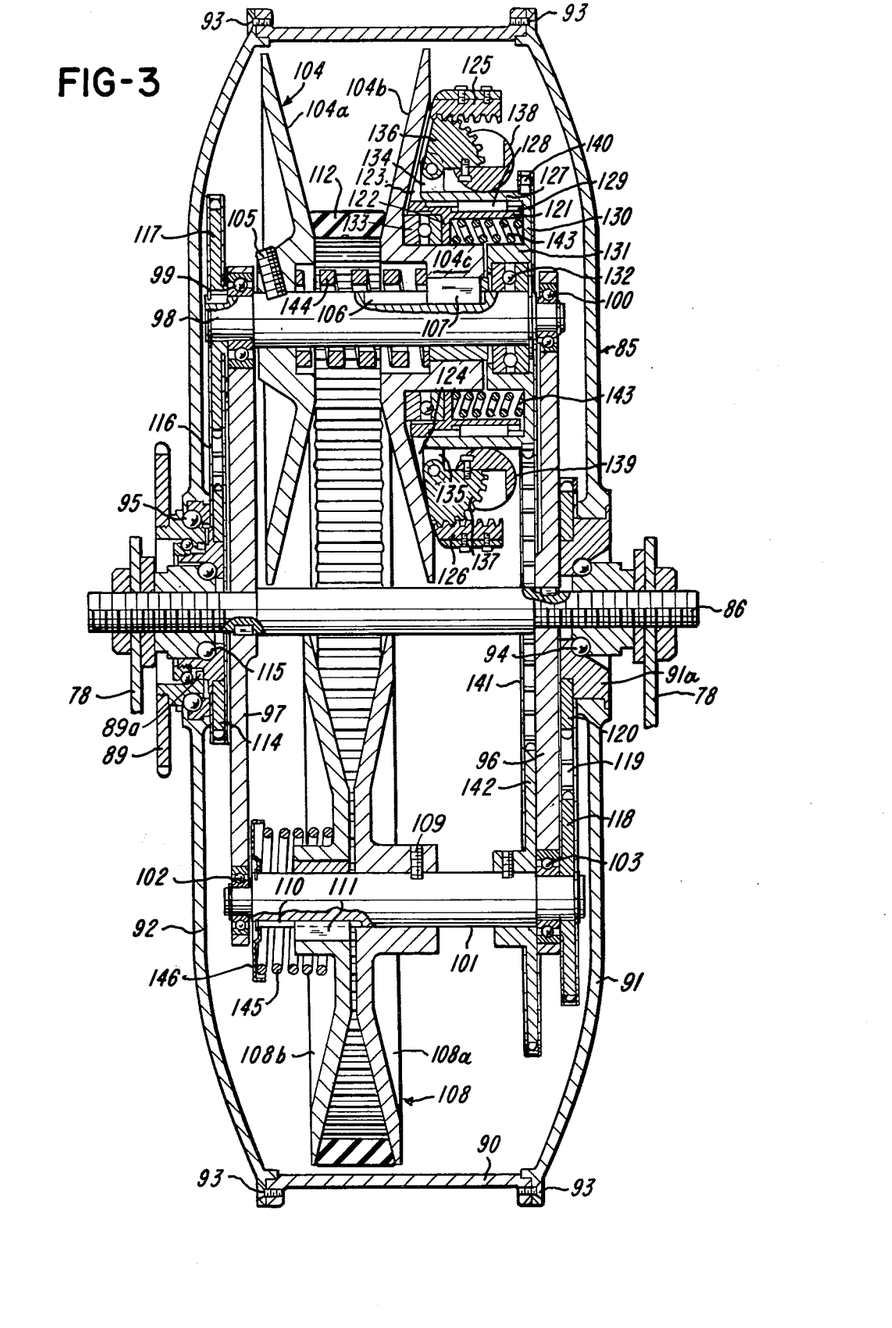
FIG. 3 is a cross sectional view of yet another embodiment providing an output speed-controlled transmission which may be applied to a pedal-driven vehicle and which utilizes the further invention concept of embodying a transmission in a unit structure.
Figure 5:
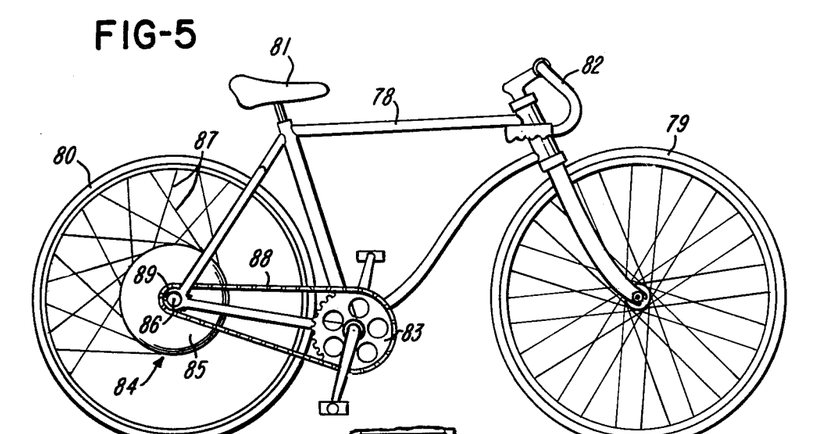
FIG. 5 is a side elevation view of a bicycle embodying the invention features shown in FIGS. 3 and 4.

FIGS. 3 and 5 illustrate a more sophisticated and preferred version of the output-controlled transmission of the present invention as applied to a bicycle. This version also embodies the invention concept of providing a transmission which is housed or encapsulated to afford a most easily applied unit which can serve also as a hub for a rotary drive element.

FIG. 5 illustrates a conventional bicycle having a main frame 78 supporting a front wheel 79, a rear wheel 80, a seat 81, handle bars 82 and a conventional pedal and drive sprocket assembly 83. In this embodiment, the transmission generally indicated at 84 comprises a housing 85 rotatively mounted on the rear axle 86 of the bicycle. The housing 85 forms the hub for rear wheel 80 and the rear wheel is supported thereon by conventional spokes, some of which are illustrated at 87. The conventional pedal drive sprocket assembly 83 is connected by a cog chain 88 to a drive sprocket 89 for the transmission.

For a complete understanding of the details of the invention transmission, reference is made to FIG. 3 wherein rear axle 86 is shown to be non-rotatively mounted in connection with portions of the frame 78 and mounting the transmission housing 85. The latter comprises an annular rim-like structure 90 and two circular side portions 91 and 92. The side portions 91 and 92 are affixed to the rim-like portion 90 by screws or other appropriate means 93. As shown, the housing 85 is rotatably mounted on the rear axle 86 by appropriate bearing means 94 and 95.

Within the housing a pair of laterally spaced frame members 96 and 97, immovably fixed on rear axle 86, support an input shaft 98 for rotation in suitably connected bearing means 99 and 100. The input shaft 98 is equivalent to input shaft or shaft extension 50 in FIG. 2. The same frame members also support an output shaft 101 in appropriate bearing means 102 and 103. The output shaft 101 is equivalent to output shaft 46 of FIG. 2.

The input shaft 98 carries a pulley assembly comprising a first pulley half 104a fixedly attached thereto by appropriate means including set screw 105. A second pulley half 104b is non-rotatively mounted on input shaft 98, but made shiftable axially thereof toward and away from pulley half 104a in any appropriate manner, such as by providing shaft 98 with a longitudinal slot 106 accommodating a key 107 on pulley half 104b.

The output shaft 101 carries a pulley assembly, generally indicated at 108. This output shaft assembly comprises a first pulley half 108a fixedly and non-rotatively mounted on output shaft 101 by any appropriate means including set screw 109. A second pulley half 108b is nonrotatively mounted on but shiftable axially of the output shaft 101, toward and away from pulley half 108a. As in the case of the input shaft, the output shaft 101 may be provided with a longitudinal slot 110 to receive a key 111 on pulley half 108b. The pulley assemblies 104 and 108 are joined by a V-belt 112.

The transmission drive sprocket 89 is rotatively mounted on rear axle 86 and operatively connected to a second drive sprocket 114 by ratchet means 89a permitting free wheeling as is known in the art. The drive sprockets 89 and 114 are mounted between bearing means 95 and 115. It will be noted that sprockets 89 and 114 rotate together, but independently of the housing 85.

Noting FIG. 5, sprocket 89 is connected to the pedal and drive sprocket assembly 83 by drive chain 88. Sprocket 114, in turn, is connected by a cog belt 116 to a sprocket 117 fixedly mounted on input shaft 98. Sprocket 114, chain 116 and sprocket 117 are equivalent to sprocket 53, cog belt 55 and sprocket 54 of FIG. 2. Accordingly, rotation imparted to sprocket 89 by pedal and drive sprocket assembly 83 and chain 88 will also be imparted to input shaft 98. Rotation of input shaft 98 and its pulley assembly 104 will be transmitted, through the V-belt 112, to pulley assembly 108 and output shaft 101. Fixed to one end of output shaft 101 is a sprocket 118, connected by chain 119 to another sprocket 120 affixed to the portion 91a of housing side 91. By this means the rotation of shaft 101 is imparted to housing 85. Housing 85, in turn, being the hub of wheel 80, imparts its rotation to the rear bicycle wheel in which it is embodied. Sprocket 118 may be considered to be equivalent to sprocket 58 of FIG. 2.

As in FIG. 2, the means for sensing the rotational speed of the output shaft is mounted on the input shaft to cause a shifting of input shaft pulley half 104b toward and away from fixed pulley half 104a. To this end, pulley half 104b has a rearward tubular extension 104c, rotatably mounting a sleeve 121. The sleeve 121 has an annular interior flange 122 and a pair of outwardly projected arms 123 and 124 bearing racks 125 and 126, respectively.

A second sleeve 127 surrounds the sleeve 121 and is rotatable therewith by virtue of the key 128 affixed to sleeve 127 and riding in a longitudinal slot 129 in the periphery of sleeve 121. The sleeve 127 has an in-turned flange portion 130 at one end which terminates in an L-shaped portion 131. The L-shaped portion 131 rides on a bearing means 132. The remainder of sleeve 127 is supported by sleeve 121, which in turn rides on bearing means 133 mounted on the extension 104c of pulley half 104b.

Sleeve 127 carries a pair of arms 134 and 135 to which are pivotally affixed gear segments 136 and 137, respectively. The gear segments 136 and 137 which are adapted to respectively cooperate with racks 125 and 126 carry centrifugal weights 138 and 139, respectively.

The sleeve 127 also fixedly mounts a sprocket 140 which is connected by a chain 141 to a sprocket 142 fixed on output shaft 101.

It will be evident from the foregoing that rotation of shaft 101 will produce a common and simultaneous rotation of sleeves 127 and 121, which are keyed together. As the speed of rotation of sleeves 127 and 121 increases, centrifugal weights 138 and 139 will swing outwardly and away from input shaft 98. Through the agency of gear segments 136 and 137 and the cooperating racks 125 and 126, the sleeve 121 will be shifted to the left, as viewed in FIG. 3. This shifting of sleeve 121 will cause a similar shifting of pulley half 104b toward pulley half 104a. L This is true because the interior annular flange 122 of sleeve 121 bears against bearing 133 which in turn bears against pulley half 104b.

A plurality of springs 143 are located within sleeve 121. One end of each of the springs 143 abuts the flange 122 of sleeve 121 while the other end of each spring abuts the portion 130 of sleeve 127.

A control spring 144 is mounted on input shaft 98 to have the ends thereof respectively abut pulley halves 104a and 104b. Control spring 144 is equivalent to control spring 76 of FIG. 2 and serves the same purposes.

Finally, a spring 145 is mounted about output shaft 101. One end of spring 145 abuts shiftable pulley half 108b. The other end of the spring abuts a cup-shaped flange 146 mounted on the output shaft. Spring 145 is equivalent to spring 77 of FIG. 2 and serves the same purposes, i.e., it assures proper shifting of pulley half 108b upon shifting of pulley half 104b and that proper tension is maintained on V-belt 112.

The operation of the embodiment of FIG. 3 is essentially the same as that described with respect to FIG. 2. After the initial startup phase, the rotational speed of output shaft 101 will be sensed by the centrifugal weights 138 and 139 since the rotation of output shaft 101 is imparted to the weights through the agency of sprocket 142, chain 141 and sprocket 140. As the rotational speed of output shaft 101 increases, the weights will swing outwardly. Gears 136 and 137, cooperating with racks 125 and 126, respectively, will cause a shift of sleeve 121 and thus pulley half 104b toward pulley half 104a. This same cooperation of the racks and gears will maintain sleeve 127 in its proper position. The closing of pulley assembly 104 will result in an opening of pulley assembly 108 and the desired ratio change. Again, racks 125 and 126 and gears 136 and 137, together with control spring 144, may be so chosen and configured that the cyclist (after initial startup) may pedal at a constant speed regardless of the bicycle speed. Again, the bicycle speed is not limited by the input shaft speed and no manual gear changes or complex gear systems are required. The embodiment of FIG. 3 has the further advantage that it is fully enclosed and located within rear wheel 80 (see FIG. 5). In this respect, the very concept of an enclosed transmission of a unit character which may afford a separable element of a drive system is significantly unique and even more so is the embodiment of the unit as a hub of a rotary drive element.

It will be noted that when the transmission is at rest the pulley assemblies 104 and 108 and V-belt 112 will assume the positions shown in FIG. 3, under the influence of springs 144 and 145. The function of springs 143 is to assist the centrifugal weights in their outward movement to maintain the proper force balance necessary to achieve the desired predetermined rotational speed condition of the input shaft 98.

Figure 4:
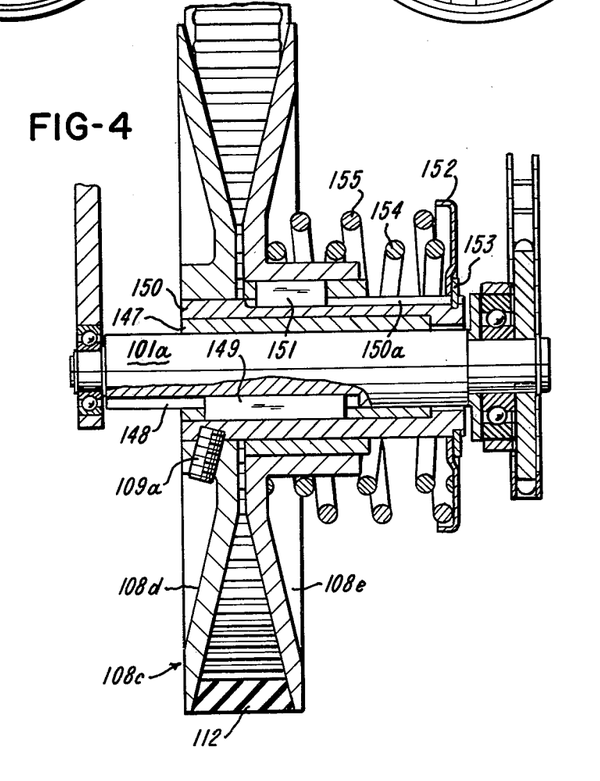
FIG. 4 is a fragmentary elevation view illustrating, in cross section, a modification of the embodiment of FIG. 3.

FIG. 4 illustrates a modification of the embodiment of FIG. 3. Like parts have been given like index numerals. The embodiment of FIG. 4 differs from that of FIG. 3 in that the pulley assembly on the output shaft and the spring in association therewith to maintain proper tension on the V-belt float with respect to the output shaft. This arrangement assures, among other things, that the V-belt does not become skewed during shifting of the pulley assemblies, thus eliminating undue wear on the V-belt 112. This embodiment also makes better and more efficient use of the space within the housing 85.

In the embodiment of FIG. 4, the output shaft, shown at 101a, is mounted in a manner identical to that described with respect to FIG. 3 and slidably mounts a bearing sleeve 147. The sleeve 147 is non-rotatable with respect to the output shaft, by virtue of the fact that the output shaft is provided with a longitudinal slot 148 in which a key 149 affixed to sleeve 147 is located. While the sleeve 147 will rotate with output shaft 101a, it will also shift axially thereof within the limits of the slot 148.

A second sleeve is shown at 150. The sleeve 150 is affixed to the sleeve 147 and rotates therewith. The output shaft pulley assembly is indicated at 108c and comprises a first pulley half 108d fixedly secured to sleeve 150 by any suitable means such as set screw 109a. A second pulley half is shown at 108e. This pulley half is rotatable with sleeves 150 and 147 and input shaft 101a and is axially shiftable therealong toward and away from pulley half 108d. This is accomplished by providing sleeve 150 with a longitudinal slot 150a in which is located a key 151 affixed to pulley half 108e. It will be noted from the structure thus far described that the fixed and shiftable pulley halves have been reversed in position with respect to those shown in FIG. 3.

The sleeve 150 carries a one end a cup-like flange 152 held on the sleeve 150 by a clamping ring 153. In this embodiment, a pair of springs 154 and 155 are located about the sleeve 150. One end of each of these springs abuts the flange 152, while the other end of each of these springs abuts pulley half 108e. The springs 154 and 155 serve the same purpose as spring 145 in FIG. 3.

Except for the modifications just described, the embodiment of FIG. 4 is otherwise identical to the embodiment of FIG. 3 and its operation is the same.

Figures 6, 8:
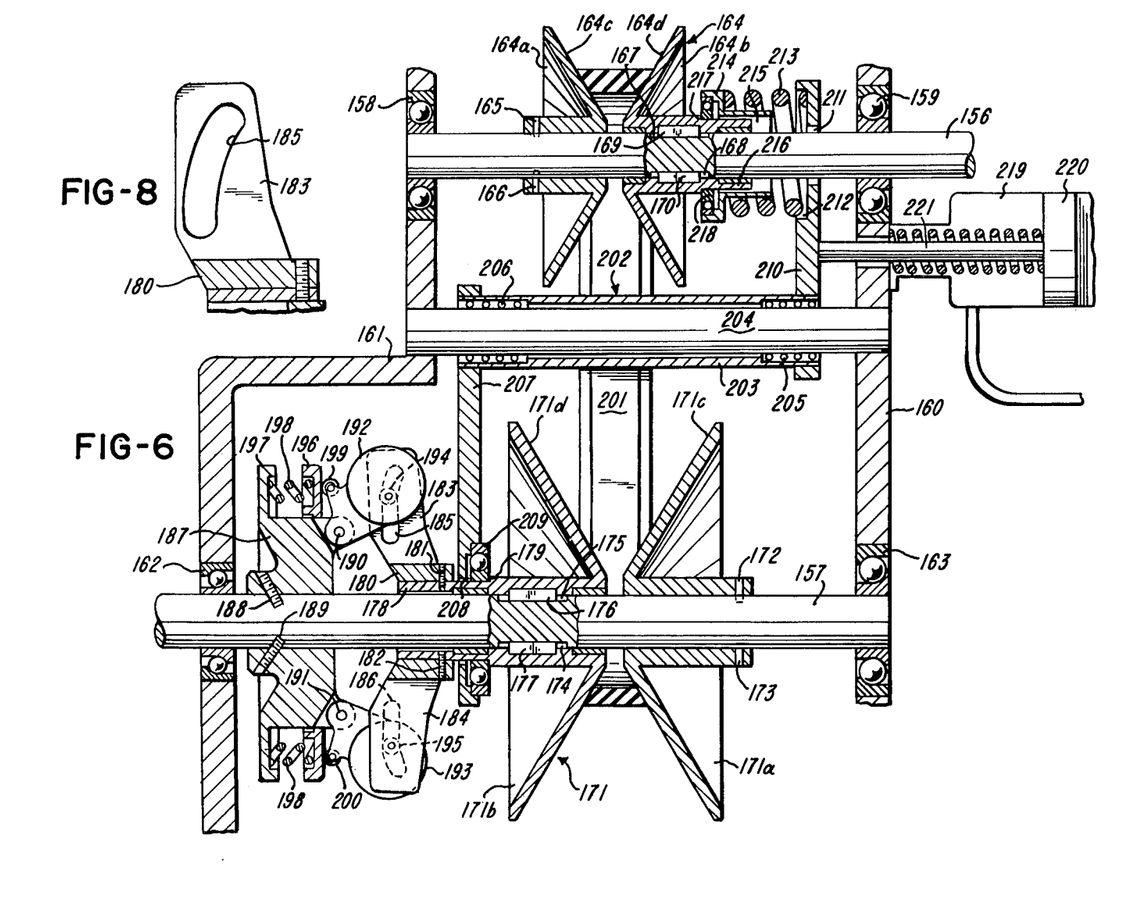
FIG. 6 is a fragmentary sectional view of a further embodiment of the output speed-controlled transmission concept of the present invention.
FIG. 8 is a fragmentary sectional view illustrating an alternate configuration for the cam groove embodied in FIG. 6.

Another basic embodiment of the output speed-controlled transmission of the present invention is illustrated in FIG. 6 which shows an input shaft 156 and an output shaft 157. The input shaft 156 is rotatively mounted in appropriate bearing means 158 and 159 in a frame structure 160 and 161, respectively. Output shaft 157 is supported by frame members 160 and 161 in suitable bearing means 162 and 163 to be in parallel spaced relation to the shaft 156. It will be understood by one skilled in the art that the frame structure 160–161 may constitute the transmission housing.

An input shaft pulley assembly is generally indicated at 164 to comprise two halves 164a and 164b having conical surfaces 164c and 164d, respectively. These conical surfaces slope inwardly and toward each other to define a V-shaped notch. Pulley half 164a is non-rotatively and fixedly mounted on the input shaft 156 as by the pinning indicated at 165 and 166, while pulley half 164b is non-rotatively affixed to the input shaft 156 but shiftable axially thereof toward and away from pulley half 164a. As in FIG. 1, the input shaft 156 is shown to be provided with at least one diametrical pair of longitudinal slots 167 and 168 and the pulley half 164b is provided with keys 169 and 170 adapted to be slidably received in the slots 167 and 168, respectively.

An output shaft pulley assembly 171, similarly to the pulley assembly 164, is made up of two halves 171a and 171b which also form a V-shaped notch. Pulley half 171a is non-rotatively and fixedly mouned on the output shaft, again by any appropriate means such as pins 172 and 173. Pulley half 171b is non-rotatively mounted on the output shaft 157, but is axially shiftable thereon toward and away from pulley half 171a. Again, this mounting may be accomplished in any appropriate manner as by means of shaft slots 174 and 175 and pulley keys 176 and 177.

Pulley half 171b has a tubular extension 178 thereon of lesser diameter than the pulley half body and defining an annular shoulder 179. Non-rotatively affixed to the pulley half extension 178, by any suitable means such as set screws 181 and 182, is a tubular member 180. The member 180 has formed thereon a pair of ears 183 and 184 having cam grooves 185 and 186. By virtue of its attachment to the pulley half extension 178, member 180 is non-rotatable relative to the shaft 157, but is axially shiftable there-along together with the pulley half 171b.

A mounting means 187 is non-rotatively and fixedly mounted on the output shaft 157 by any appropriate means such as pins or set screws 188 and 189. The mounting means 187 has pivotally affixed thereto as at 190 and 191 a pair of centrifugal weights 192 and 193, respectively. The weights 192 and 193, in turn, bear rollers 194 and 195 adapted to ride in the cam grooves 185 and 186, respectively, of the member 180.

With the structure thus described, as the speed of output shaft 157 is increased, the centrifugal weights 192 and 193 will pivot outwardly about the pivot points 190 and 191, respectively. This causes rollers 194 and 195 to move outwardly in cam grooves 185 and 186, respectively, and, in turn, causes pulley half 171b to move away from the fixed pulley half 171a thereby widening the V-shaped groove between the pulley halves 171a and 171b. Means are provided to regulate the movement of the weights 192 and 193. To this end, mounting means 187 mounts in turn a longitudinally shiftable annular ring 196 positioned in facing spaced relation to an annular flange 197 formed integral with one end thereof. A plurality of control springs 198 are located between the flange 197 and the ring 196. The centrifugal weights 192 and 193 bear extensions carrying rollers 199 and 200, respectively. The rollers 199 and 200 engage the ring 196 at its surface remote from the flange 197. Thus, the outward movement of centrifugal weights 192 and 193 is against the action of control springs 198.

It will be evident that the maximum amount of shifting of the movable pulley half 171b is determined by the pulley keys 176 and 177 and their respective shaft slots 174 and 175. The range of movement of pulley half 171b within this maximum capability will be governed by control springs 198 and the configuration of cam grooves 185 and 186, in cooperation with the centrifugal weights 192 and 193. By appropriate configuration of the cam grooves 185 and 186 and by careful selection of control springs 198, the shifting of pulley half 171b in response to the speed of the output shaft 157 can be fully controlled.

Pulley assemblies 164 and 171 are connected by a V-belt 201. As in the previous embodiments, in order for the desired transmission ratio change to take place, it is necessary that shiftable pulley half 164b on the input shaft 156 move simultaneously and oppositely at the time when the shiftable pulley half 171b on output shaft 157 is moved so that the slack in V-belt 201 is appropriately taken up.

To accomplish appropriate corresponding movements of pulley halves 164b and 171b, these pulley halves may be mechanically connected by a yoke means generally indicated at 202 and substantially identical to yoke means 30 of FIG. 1. The yoke means comprises a cylindrical element 203 mounted on a shaft 204 extending between frame members 160 and 161 and in parallel spaced relationship with input shaft 156 and output shaft 157. The cylindrical element 203 is axially shiftable with respect to shaft 204 by means of appropriate bearing elements 205 and 206.

At one end the cylindrical element 203 has an arm 207. The arm 207 has a perforation 208 through which the output shaft 157 and the extension 178 of the pulley half 171b passes. An appropriate thrust bearing 209 is located between the arm 207 and the shoulder 179 of the pulley half 171b.

The cylindrical element 203 carries at its other end a second arm 210 which has a perforation 211 therethrough. The input shaft 156 passes with clearance through the perforation 211. About the perforation 211 there is an annular depression 212 formed in the arm 210. This depression is adapted to receive one end of spring 213. The other end of spring 213 abuts an annular flange 214 on a sleeve 215 which surrounds an extension 216 on pulley half 164b. The extension 216 is of lesser diameter than the pulley body forming an annular shoulder 217. A thrust bearing 218 is located between the sleeve flange 214 and the pulley shoulder 217.

As in the case of spring 40 of FIG. 1, the spring 213 serves two purposes. First of all, it assures that the arm 207 of yoke assembly 202 is always in contact with thrust bearing 209 and therefore pulley half 171b. Furthermore, it assures that the pulley assemblies 164 and 171 will exert sufficient force on V-belt 201 to prevent slippage thereof.

Again, the yoke assembly 202 assures proper movement of pulley halve 164b and 171b. It also maintains correct alignment of V-belt 201 when one pulley is opened and the other is closed, thereby minimizing skewing of the belt and consequent accelerated wear thereof.

As in the embodiment of FIG. 1, it is within the scope of the invention to eliminate the yoke assembly 202. Under these circumstances, the right hand end of spring 213 (as viewed in FIG. 6) will be provided with appropriate abutment means. The spring 213 will be relied upon to cause the pulley assemblies to maintain proper tension on the V-belt 201 and to enable pulley half 164b to shift toward or away from pulley half 164a upon the occurrence of an axial shift of pulley half 171b.

Operation of the output speed-controlled transmission of FIG. 6 may be described as follows. Assuming the transmission is used as an automotive transmission, input shaft 156 will be connected to the output shaft of the automobile engine (not shown) through a clutch (not shown). The output shaft 157 will be connected to the rear wheel assembly of the automobile (not shown) through a standard differential (not shown) and a conventional forward-neutral-reverse gear assembly (not shown). Let it further be assumed that the control springs 198 are so chosen and the cam grooves 185 and 186 are so configured that after an initial startup phase the automobile engine is intended to operate at a constant speed.

After the initial startup phase, if an increase in vehicle speed is desired, the operator will depress the accelerator pedal. This causes an increase in throttle opening of the engine intake system which in turn causes the engine torque output to increase. The increased engine torque is transmitted to the differential and drive wheels of the vehicle through the output speed-controlled transmission and the forward-neutral-reverse gear assembly. The increased torque at the rear wheels of the vehicle will accelerate the vehicle. As the vehicle begins to change speed, a simultaneous change in speed of the output shaft 157 will occur. This increase in speed of output shaft 157 will result in an outward swinging of centrifugal weights 192 and 193. The amount of radial displacement of weights 192 and 193 with the increase in the speed of output shaft 157 will be determined primarily by control springs 198.

Outward movement of centrifugal weights 192 and 193 will result in an axial shift of pulley half 171b away from pulley half 171a by virtue of weight rollers 194 and 195 in cam slots 185 and 186 of member 180 affixed to the extension 178 of pulley half 171b. The amount of axial shift of pulley half 171b with respect to the radial movement of centrifugal weights 192 and 193 will be prescribed by the configuration of cam grooves 185 and 186.

The axial shift of pulley half 171b away from pulley half 171a will cause a simultaneous and opposite shift of pulley half 164b toward pulley half 164a by virtue of the yoke assembly 202. Thus, simultaneously, the opening of pulley assembly 171 is translated through the yoke assembly 202 to a closing of pulley assembly 164. The relative opening of pulley assembly 171 and closing of pulley assembly 164 causes the belt 201 to shift outwardly on pulley assembly 164 and inwardly on pulley assembly 171. Thus a new transmission ratio is established.

When the vehicle speed is reduced to that speed determined by the startup phase, the various elements of the transmission will function in a manner opposite to that just described. Thus, the centrifugal weights 192 and 193 will swing inwardly toward the output shaft 157 and the pulley assembly 171 will be closed while the pulley assembly 164 will be opened. Thus, the original transmission ratio after the startup phase will be reestablished. When the control springs 198 are appropriately chosen and the cam slots 185 and 186 are appropriately configured, the engine speed will remain constant throughout the above described speedup and slowdown procedure. If, thereafter, the vehicle is brought to a halt, it will be understood that during the stop phase reduction of speed of the output shaft 157 will be accompanied by a reduction of speed of the input shaft 156.

Under such circumstances, it may be desirable to provide a manually or automatically controlled override which will apply an external force to counteract the controlling centrifugal force of the assembly of FIG. 6. For example, in an automotive application if the normal operational mode would be for constant engine speed above the startup phase to minimize emissions, higher power demands (such as those required in passing) could be achieved through the override to effect a change in numerical drive ratio to correspond to a higher power output engine speed.

An exemplary override is illustrated in FIG. 6. The override comprises a hydraulic cylinder 219 having a piston 220 and piston rod 221. It will be understood that the cylinder 219 may be manually or automatically actuable.

The piston rod 221 is operatively connected to the arm 210 of yoke assembly 202. Thus, an axial shifting of the piston rod 221 will shift the yoke assembly 202. This, in turn, through cam grooves 185 and 186 will move the centrifugal weights 192 and 193 as well as the pulley half 171b and the pulley half 164. Thus, a new numerical drive ratio will be established. It will be understood by one skilled in the art that other well known means may be employed to shift the yoke assembly 202 and thereby counteract the control of centrifugal weights 192 and 193.

Figure 7:
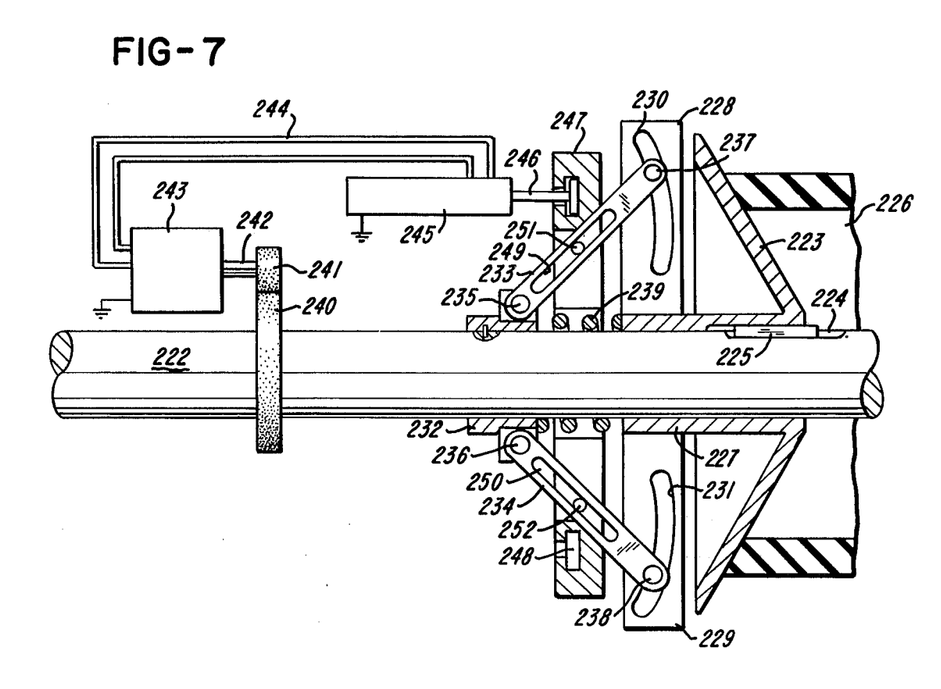
FIG. 7 is a fragmentary, partially diagrammatic, view illustrating a modified form of speed sensing means for the output shaft of the invention transmission.

In each of the embodiments thus far described a centrifugal weight assembly has been described as serving as a sensing-transfer transducer to sense a change in the output shaft speed and to transfer this to a ratio change. It will be understood by one skilled in the art that any transducer sensitive to the output shaft speed could be employed to produce the same effect. To illustrate this, a hydraulic sensing-transfer transducer is illustrated in FIG. 7 wherein a transmission output shaft is fragmentarily illustrated at 222. The shaft 222 may be equivalent to output shaft 157 of FIG. 6, for example. The movable half of an output shaft pulley assembly is shown at 223 and may be equivalent to shiftable pulley half 171b of FIG. 6. As described above, pulley half 223 is non-rotatably mounted on shaft 222, but is axially shiftable therealong. This may be accomplished by providing a longitudinal slot 224 in the shaft 222. Pulley half 223 has a key 225 receivable and slidable within the shaft slot 224. Pulley half 223 will be engaged by a V-belt 226 which may be the same as belt 201 of FIG. 6.

Pulley half 223 has a rearward cylindrical extension 227 to which is mounted a pair of ears 228 and 229 bearing cam grooves 230 and 231. The pair of ears 228 and 229 and their cam grooves are equivalent to the member 180 and its cam grooves (see FIG. 6).

A support 232 is non-rotatively and fixedly secured to the output shaft 222. A pair of links 233 and 234 are pivotally affixed to the support 232 as at 235 and 236, respectively. The free ends of links 233 and 234 bear cam rollers 237 and 238 adapted to ride in cam grooves 230 and 231, respectively. It will be evident from the structure thus far described that as the free ends of links 233 and 234 move away from the output shaft 222, the rollers thereon will coact with the cam grooves 230 and 231 to move the pulley half 223 to the left, as viewed in FIG. 7. Similarly, movement of the free ends of links 233 and 234 toward the output shaft 222 will cause a shift of pulley half 223 toward the right, as viewed in FIG. 7. To control this movement, a control spring 239 is mounted on output shaft 222. One end of the spring 239 abuts the end of the cylindrical extension 227 of pulley half 223. The other end of spring 239 abuts the support 232. Thus, outward movement of the free ends of links 233 and 234 and a shifting of pulley half 233 toward the left will be controlled by spring 239. In this manner, spring 239 serves the same purpose as described with respect to control springs 198 of FIG. 6. By appropriate selection of spring 239 and by appropriate configuration of cam grooves 230 and 231, the ratio change accomplished by the transmission can be determined as desired.

A friction wheel 240 is non-rotatively affixed to output shaft 222. This wheel coacts with a friction wheel 241 on the rotor 242 of a hydraulic pump 243. It will be understood that wheels 240 and 241 may be gears. The output 244 of the hydraulic pump is connected to a cylinder 245, the piston rod 246 of which is operatively connected to links 233 and 234 by disc member 247. The end of piston rod 246 is captively held in an annular groove 248 in the disc member. The disc member 247 is slotted to receive links 233 and 234. The links themselves are slotted as at 249 and 250. Pins 251 and 252, affixed to the disc member 247, ride in the link slots 249 and 250.

It will be understood that the pump 243 will produce a hydraulic pressure proportional to the speed of output shaft 222. An increase in shaft speed will cause retraction of piston rod 246. As a consequence of this, the links 233 and 234 will be moved outwardly by the disc member 247 and pulley half 233 will be moved toward the left in FIG. 7.

FIG. 7 may also be considered as representing an electric sensor. In such an instance, the pump 243 may be considered to be an electric generator and the cylinder 245 may be considered to be solenoid. The generator 243 will produce a voltage input to solenoid 245 proportional to the speed of output shaft 222. The rod 246, now a solenoid core, will move pulley half 223 in the same manner described above and with increased force as the generated voltage increases, brought about by an increase in speed of the output shaft 222.

As indicated above, the transmission of the present invention can be so designed and the cam grooves can be so configured as to accomplish a decreasng input shaft speed with an increasing output shaft speed. FIG. 8 illustrates an alternate configuration of cam groove 185 in ear 183 of cylindrical member 180 of FIG. 6. Such a configuration of cam grooves 185 and 186 in the embodiment of FIG. 6 will result in a decreasing input shaft speed with an increasing output shaft speed.

An example of the useful application of such a transmission is as a speed governor for a vehicle such as an automobile. In such an instance, the output-controlled transmission would be so designed so that the centrifugal forces would begin to activate the control at a predetermined vehicle speed, for example, at 80 miles per hour. Under these circumstances, the transmission of the present invention would be employed as a governor only and would be in addition to a regular automobile transmission. It could be incorporated in the casing of the regular transmission so that the regular transmission output shaft is connected to the input shaft of the instant transmission and the output shaft of the instant transmission becomes the output shaft of the transmission-governor combination.

In such an application, for all types of vehicle operation up to 80 miles an hour the transmission of the present invention, acting as a governor, would execute no control and would have no effect on the operating characteristics of the vehicle. However, when the vehicle speed reaches 80 miles per hours, a further increase in vehicle speed (i.e., a further increase in the rotational speed of the governor output shaft) would actuate the centrifugal mechanism or other sensing means to cause the rotation speed of the input shaft of the governor and thus the speed of the automobile engine to decrease.

As the vehicle speed increases, more power must be supplied by the engine to overcome increased wind resistance and the like. Automobile engines develop power which ideally increases linearly with engine speed. Thus, as the vehicle speed increases and the engine speed decreases under the influence of the governor, the power required to drive the vehicle increases but the power available from the engine decreases. The rate at which the speed of the input shaft of the governor decreases with increased speed of the output shaft is determined by the shape of the cam grooves. This shape could be designed such that as the vehicle reaches 90 miles an hour, the engine speed would have attained the point where the maximum power developed would equal the power required to drive the vehicle and no further increase in vehicle speed would be possible.

This arrangement differs markedly from conventional governor means which limit engine speed rather than vehicle speed and are controlled by engine speed rather than vehicle speed. Thus, conventional governors can limit vehicle speed but have the disadvantage of also limiting the acceleration capabilities of the vehicle when driving below the limiting vehicle speed. By employing the output-controlled transmission of the present invention as a governor, the vehicle could realize its full acceleration potential at normal speeds and yet be limited in ultimate speed.

Accordingly, as set forth herein the invention embodies two concepts constituting basic improvement in the transmission and governor art. The first provides a unique output speed controlled transmission which is capable of serving a multitude of purposes though for practical reasons the illustration of the application and embodiment of the invention has been limited for purposes of this disclosure.

Accordingly, as set forth herein, the invention provides a unique unitized transmission the output of which is directed through movement of its housing. The encapsulated unit so provided may be inserted in any drive system with unique results, whether the transmission is output speed-controlled as in the referred embodiment here described or speed-controlled in any conventional manner. This last is so since the invention provides that the housing of the transmission unit becomes a functional element of the unit and serves as a positive medium for transmitting the transmission output to further elements in any drive system in which it may be embodied, whether as the hub of the further drive element or as a member coupling thereto through an intervening drive means. As noted, the embodiment of the particular features of the output speed transmission concept detailed herein provides particularly advantageous embodiments.

In any case, the invention unit may be easily applied to form part of any type of drive system and has important advantages whether it be incorporated in the drive system of a stationary machine or in a vehicle such as a bicycle or an automotive type vehicle.

As will be seen, any one of the illustrative embodiments of a transmission unit which are set forth herein may be encapsulated and housed to employ basic features of the invention as will be well evident by the appended claims.

As indicated and has become increasingly apparent since the conception of the present invention, the concept of providing a transmission unit wherein the housing thereof forms a drive element or even the hub of an element driven thereby is uniquely important in the transmission art independent of the nature and character of the transmission. Accordingly, such is comprehended by the invention as an important advance in the art.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. A transmission unit comprising an input shaft, an output shaft, adjustable drive means through which said input shaft drives said output shaft, means associated with one of said shafts and responsive to the rotational speed thereof, said responsive means being operatively related to said drive means to adjust the transmission ratio between said input and output shafts in response to changes in rotational speed of said one of said shafts, a housing for said apparatus and means connecting said output shaft in a driving relation to said housing.

2. A transmission unit as in claim 1 characterized in that said input shaft is connected to the output shaft of a preceding transmission embodied in a drive system operatively connected to and driven by an engine and said output shaft of said transmission unit is drivingly related to further drive means in the machine in which it is embodied and said responsive means provides means effective to govern the speed of said further drive means by governing the speed of said input shaft.

3. Apparatus as in claim 1 characterized in that said housing is connected to form part of further drive means in the machine in which it is embodied.

4. Apparatus as in claim 3 characterized in that said housing is embodied in a drive wheel and forms the hub thereof.

5. Apparatus as in claim 4 characterized in that said drive wheel provides a drive wheel in a vehicle the frame of which mounts an axle on which said housing is rotatably mounted.

6. Apparatus as in claim 1 characterized in that said housing mounts, for rotation relative thereto, means for transmitting a driving force to rotate said input shaft.

7. Apparatus as in claim 6 characterized in that said housing is embodied to form the hub of a bicycle wheel and the frame of the bicycle to which the wheel is applied mounts an axle on which said housing is rotatably mounted and further mounts means drivingly related to said means for transmitting a driving force to rotate said input shaft.

8. Apparatus as in claim 1 characterized in that said housing is mounted for rotation on an axle fixed in a machine to which said transmission unit is applied and positioned within said housing and fixed to said axle is support structure in which said input and output shafts are mounted in parallel spaced relation and said housing accommodates, for rotation therein and relative thereto, means for effecting a primary drive of said input shaft the consequence of which is a drive of said output shaft and said housng thereby.

9. Apparatus as in claim 1 characteried in that said one of said shafts of said transmission unit is said output shaft.

10. Apparatus as in claim 9 characterized in that said responsive means is mounted on a portion of said input shaft.

11. Apparatus as in claim 9 characterized in that said responsive means is mounted on said output shaft.

12. Apparatus as in claim 9 characterized in that said output shaft is drivingly related to said means which is responsive to changes in the rotational speed thereof.

13. Apparatus as in claim 1 characterized in that said adjustable drive means comprises an input pulley assembly on said input shaft, an output pulley assembly on said output shaft, and a belt connecting said pulley assemblies, each of said pulley assemblies includes a half fixed in position on and for rotation with its related shaft and a mating half connected for rotation with the shaft to which it mounts but axially shiftable to and from the associated fixed half to change the effective diameter of the pulley assembly, and said responsive means is operable to change the effective diameter of at least one of said pulley assemblies in correspondence with changes in rotational speed of said output shaft and means are provided to correspondingly and automatically provide a change in the effective diameter of the other of said pulley assemblies.

14. Apparatus as in claim 13 wherein said responsive means comprises an hydraulic system having a pump, a source of hydraulic fluid and a cylinder, said cylinder having a piston and piston rod operatively connected to said shiftable pulley half of one of said input and output pulley assemblies, said pump having an output connected to said cylinder, said pump being driven by said output shaft and producing an output fluid pressure proportional to the rotational speed of said output shaft whereby said cylinder piston rod will shift said shiftable pulley half to which it is operatively connected to maintain a predetermined rotational speed condition of said input shaft.

15. Apparatus as in claim 13 wherein said responsive means comprises an electrical system having a generator and a solenoid, said solenoid having a core operatively connected to said shiftable pulley half of one of said input and output pulley assemblies, said generator being connected to said solenoid, said generator being driven by said output shaft and producing a voltage proportional to the rotational speed of said output shaft whereby said solenoid core will shift said shiftable pulley half to which it is operatively connected to maintain a predetermined rotational speed condition of said input shaft.

16. Apparatus as in claim 1 characterized in that said transmission unit is mounted on a bicycle of the type having a pedal drive and at least one driven wheel, said pedal drive is operatively connected to said input shaft and said output shaft is operatively connected to said driven wheel, through said housing.

17. Apparatus as in claim 16 characterized in that said responsive means is connected to respond to the rotational speed of said output shaft.

18. Apparatus as in claim 17 characterized in that said bicycle has in connection with the frame thereof a non-rotatable axle for said driven wheel, said housing is rotatably mounted on said axle and provides a hub for said driven wheel, means within said housing in fixed connection with said axle provides support on which said shafts are rotatably mounted and said output shaft is drivingly related to said housing and said housing in turn is drivingly related to said driven wheel.

* * * * *

UNITED STATES PATENT OFFICE
CERTIFICATE OF CORRECTION

Patent No. 4,036,068  Dated July 19, 1977

Inventor(s) Robert B. Gilbert

It is certified that error appears in the above-identified patent and that said Letters Patent are hereby corrected as shown below:

Col. 2, line 6, "difficult" is corrected to read -- difficulty --;

line 41, "form" is corrected to read -- from --.

Col. 8, line 55, "enobidment" is corrected to read -- embodiment --.

Col. 10, line 55, the letter "L" is deleted following -- 104a. --.

Col. 12, line 9, "a" (first occurrence) is corrected to read -- at --.

Col. 14, line 15, "halve" is corrected to read -- halves --.

Col. 16, line 31, "pulley half 233" is corrected to read -- pulley half 223 --;

line 57, "233" is corrected to read -- 223 --;

line 62, "a" is inserted following -- be -- (second occurrence).

UNITED STATES PATENT OFFICE
CERTIFICATE OF CORRECTION

Patent No. 4,036,068          Dated July 19, 1977

Inventor(s) Robert B. Gilbert

It is certified that error appears in the above-identified patent and that said Letters Patent are hereby corrected as shown below:

Col. 17, line 3, "decreasng" is corrected to read -- decreasing --;

line 30, "hours" is corrected to read -- hour --;

line 64, "improvement" is corrected to read -- improvements --.

Col. 18, line 8, "referred" is corrected to read -- preferred --.

Signed and Sealed this

*First* Day of *November 1977*

[SEAL]

*Attest:*

RUTH C. MASON      LUTRELLE F. PARKER
*Attesting Officer*      *Acting Commissioner of Patents and Trademarks*